United States Patent
Yu et al.

(10) Patent No.: US 10,848,240 B2
(45) Date of Patent: Nov. 24, 2020

(54) METHOD FOR EXTRACTING OPTICAL LINE FAULT SECTION BY APPLYING SUPER-RESOLUTION ALGORITHM

(71) Applicant: GCI INC., Daejeon (KR)

(72) Inventors: Bong Guk Yu, Daejeon (KR); Byung Jin Lee, Cheongju-si (KR); Kyung Seok Kim, Daejeon (KR)

(73) Assignee: GCI INC., Daejeon (KR)

( * ) Notice: Subject to any disclaimer, the term of this patent is extended or adjusted under 35 U.S.C. 154(b) by 0 days.

(21) Appl. No.: 16/611,739

(22) PCT Filed: Feb. 12, 2018

(86) PCT No.: PCT/KR2018/001799
§ 371 (c)(1),
(2) Date: Nov. 7, 2019

(87) PCT Pub. No.: WO2019/093588
PCT Pub. Date: May 16, 2019

(65) Prior Publication Data
US 2020/0112364 A1 Apr. 9, 2020

(30) Foreign Application Priority Data
Nov. 8, 2017 (KR) .................. 10-2017-0148106

(51) Int. Cl.
*H04B 10/071* (2013.01)
*H04B 10/077* (2013.01)
*H04B 10/079* (2013.01)

(52) U.S. Cl.
CPC ....... *H04B 10/071* (2013.01); *H04B 10/0775* (2013.01); *H04B 10/0791* (2013.01)

(58) Field of Classification Search
CPC .................................................. H04B 10/071
See application file for complete search history.

(56) References Cited

FOREIGN PATENT DOCUMENTS

| JP | H09-329526 A | 12/1997 |
| KR | 10-2011-0063262 A | 6/2011 |
| KR | 10-1718138 B1 | 4/2017 |

OTHER PUBLICATIONS

Lee et al., "Resolution Enhancement of Correlated OTDR Using Eigen-Decomposition Based Algorithm", The 12th International Conference on Optical Internet Proceedings, IEEE, 2014 (Year: 2014).*

Hirotsu et al. (Hirotsu et al., "Analysis of Sperm Whale Click by MUSIC Algorithm", IEEE, 2006 (Year: 2006).*

(Continued)

*Primary Examiner* — Shi K Li
(74) *Attorney, Agent, or Firm* — Paratus Law Group, PLLC

(57) ABSTRACT

Disclosed is a method of extracting a faulty section of an optical path using a super resolution algorithm. The method includes generating a MUSIC spectrum by applying a MUSIC algorithm or an improved MUSIC algorithm to a received signal. Pieces of data on the received signal are divided into predetermined unit groups, and the MUSIC algorithm or the improved MUSIC algorithm is performed only on a unit group in which a signal corresponding to a reflection event occurs, among the predetermined unit groups.

2 Claims, 12 Drawing Sheets

(56) References Cited

OTHER PUBLICATIONS

International Search Report for PCT/KR2018/001799 dated Aug. 8, 2018 from Korean Intellectual Property Office.
Kang, Heon Sik, "Optical Transceiver Type OTDR Technology", ETRI, Oct. 14, 2015, pp. 1-24.
Xiangwen Sun et al., "Harmonic Frequency Estimation Based on Modified-MUSIC Algorithm in Power System", The Open Electrical & Electronic Engineering Journal, 2015, pp. 38-42, vol. 9.

* cited by examiner

| Oversampling Ratio | 2 |
| --- | --- |
| Up sampling Ratio of ADC input | 2 |
| Down sampling Ratio | 1 |
| SNR | 40 dB |
| Correlation code | Galoy code |
| channel impulse response sample rate | 40e6 |
| pulse width | 16ms |
| Fiber Length | 5.3Km |
| Reflective Position | 5, 5.005km |

METHOD FOR EXTRACTING OPTICAL LINE FAULT SECTION BY APPLYING SUPER-RESOLUTION ALGORITHM

CROSS REFERENCE TO PRIOR APPLICATION

This application is a National Stage patent application of PCT International Patent Application No. PCT/KR2018/001799 (filed on Feb. 12, 2018) under 35 U.S.C. § 371, which claims priority to Korean Patent Application No. 10-2017-0148106 (filed on Nov. 8, 2017), which are all hereby incorporated by reference in their entirety.

BACKGROUND

The present invention relates to a method of extracting a faulty section of an optical path using an optical time domain reflectometer (OTDR) scheme and, more particularly, to a method of extracting a faulty session of an optical path using a super resolution algorithm.

Internet traffic is currently increasing due to multimedia communication. An optical communication technology provides an essential solution to a problem of an increase in communication capacity. Thus, an amount of data that is transferred through a strand of optical fiber in an optical communication system continues to increase. However, because a single optical fiber link has a terabit transfer capacity, physical damage to the link results in the loss of a large amount of data. Therefore, an optical time domain reflectometer that is used to detect a physical defect of the optical fiber link is an apparatus that is very important for an optical communication link. Generally, performance of the OTDR is determined by a dynamic range and spatial resolution.

Therefore, there is a need to improve resolution performance for a received signal to precisely predict a faulty section of an optical path.

SUMMARY

Accordingly, the present invention has been made keeping in mind the above problems occurring in the prior art, and an object of the present invention is to precisely extract a faulty section of an optical path using a super resolution algorithm.

In order to accomplish the above object, the present invention provides a method of extracting a faulty section of an optical path using a super resolution algorithm, the method including a step of generating a MUSIC spectrum by applying a MUSIC algorithm or an improved MUSIC algorithm.

In the method, pieces of data on the received signal may be divided into predetermined unit groups, and the MUSIC algorithm or the improved MUSIC algorithm may be performed only on a unit group in which a signal corresponding to a reflection event occurs, among the predetermined unit groups.

In the method, when the MUSIC algorithm or the improved MUSIC algorithm is applied to the unit group in which the signal corresponding to the reflection event occurs, among the predetermined unit groups, a predetermined number of paddings may be inserted in front of and in rear of the unit group.

In the method, a difference between maximum and minimum values of pieces of data in the unit group in which the signal corresponding to the reflection event occurs, among the predetermined unit groups, may exceed a predetermined threshold.

According to the present invention, a faulty section of an optical path can be precisely predicted by improving resolution for a received signal using a MUSIC algorithm.

Among all sections of the optical path, which are targets for monitoring, a section having a characteristic feature is extracted using a simple scheme, and a super resolution algorithm is applied only to such a section. Thus, the faulty section of the optical path can be extracted immediately, and the signal processing capability can be improved.

DETAILED DESCRIPTION

Figure 1:
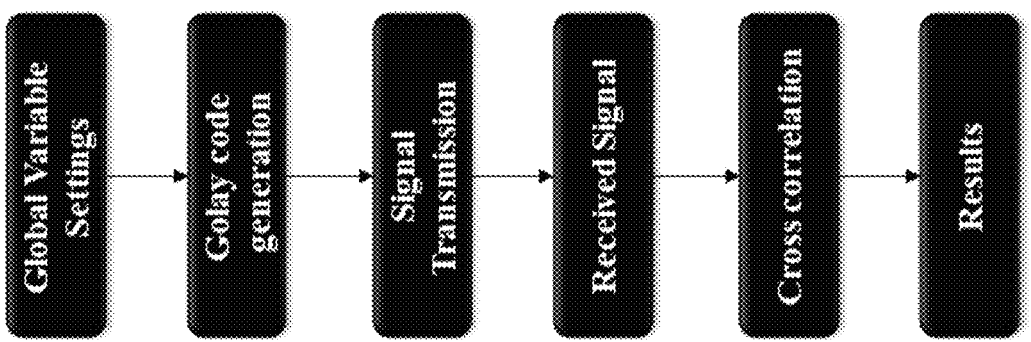
FIG. 1 is a diagram illustrating a basic configuration of an OTDR simulator.

Reference should now be made to the drawings, in which the same reference numerals are used throughout the different drawings to designate the same or similar components.

Various modifications to the present invention can be made, and thus various embodiments thereof can be realized. Thus, specific embodiments will be described in detail below with the drawings. However, this description is not intended to limit the present invention to specific embodiments. All alterations, equivalents, and substitutes that are included within the technical idea of the present invention should be understood as falling within the scope of the present invention.

The same constituent element is given the same reference character in each drawing that is referred to for description. In a case where it is determined that, in the description of the present invention, a detailed description of a technology known in the related art prevents the nature and gist of the present invention from being made apparent, the detailed description thereof is omitted.

The terms first, second, and so on may be used to describe various constituent elements but should not impose any limitation on the meanings of the constituent elements. These terms are generally used only to distinguish one element from another.

For example, a first constituent element may be expressed as a second constituent element without departing from the scope of the present invention. In the same manner, the second constituent element may also be expressed as the first constituent element.

The phrase and/or is used to include a combination of multiple relevant elements and any one of the multiple relevant elements.

It should be understood that, when a constituent element is referred to as being "connected with" a different constituent element, the constituent element may be connected with the different constituent element or an intervening constituent element may also be present therebetween.

In contrast, it should be understood that, when a constituent element is referred to as being "directly connected with" a different constituent element, no intervening constituent element is present therebetween.

The terms in the present application are used only to describe a specific embodiment without being intended to impose any limitation on the present invention.

A noun in a singular has the same meaning as a noun in a plural form unless nouns in singular and plural forms have different meanings in context. The term "include", "have" or the like in the present application is intended to indicate that a feature, a number, a step, an operation, a constituent element, a component, or combinations of these, which is described in the specification, is present, and thus should be understood not to pre-exclude the possibility that one or more other features, numbers, steps, operations, constituent elements, components, or combinations of these will be present or added.

Unless otherwise defined, all terms including technical or scientific terms, which are used in the present specification, have the same meanings as are normally understood by a person of ordinary skill in the art to which the present invention pertains.

The term as defined in a dictionary in general use should be construed as having the same meaning in context in the relevant art, and, unless otherwise explicitly defined in the present specification, is not construed as having an ideal meaning or an excessively-formal meaning.

A method of extracting a faulty section of an optical path according to a preferred embodiment of the present invention will be described with reference to the accompanying drawings. As an example, an OTDR simulator will be described below. The OTDR simulator simulates an environment where a faulty section of an optical path is predicted, as is. The following method, as is, can actually apply to an environment where the faulty section of the optical path is measured.

General Method of Measuring the Faulty Section of the Optical Path Using an OTDR FIG. 1 illustrates a basic configuration of the OTDR simulator. A MATLAB-based OTDR simulator performs 6 steps as illustrated in FIG. 1. A step of setting an event section and configuring a variable and an environment (Global Variable Settings) in order to operate an OTDR simulator, a step of generating a Golay code (Golay code generation), a step of transmitting a signal (Signal Transmission), a step of receiving the signal (Received Signal), a step of performing cross correlation of the received signal (Cross Correlation), and a step of deriving results (Results) are performed.

Figure 2:
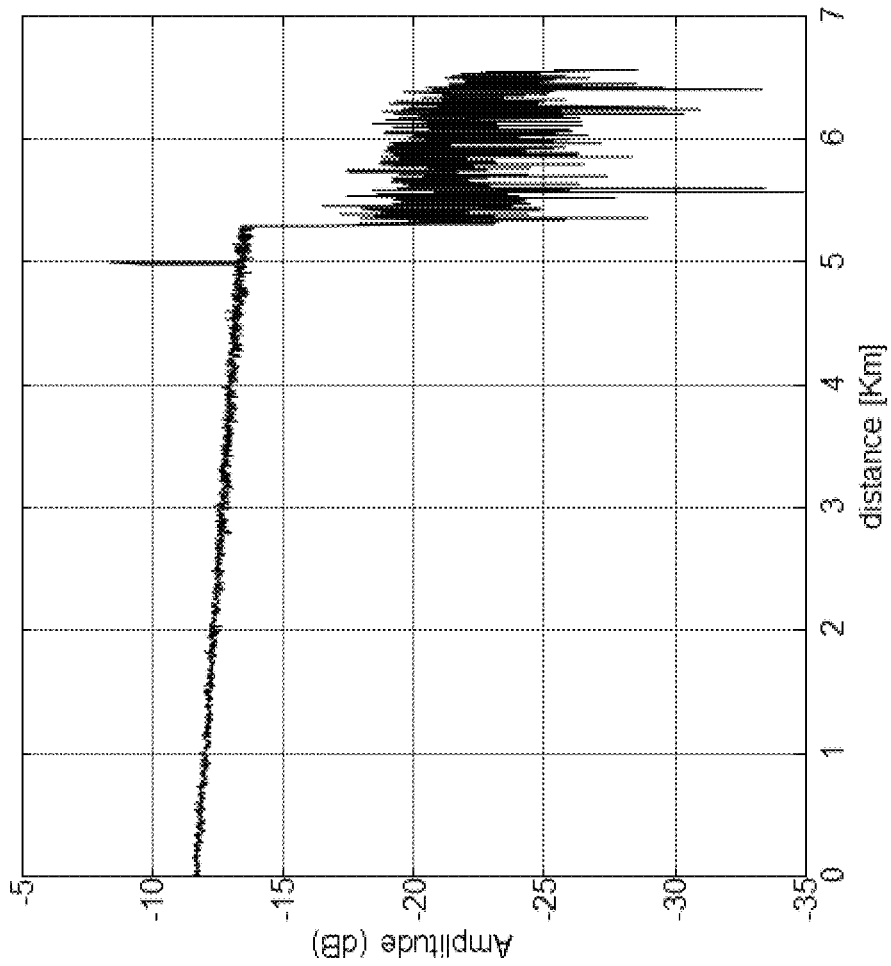
FIG. 2 is a diagram illustrating a result that was obtained by operating the OTDR simulator as illustrated in FIG. 1.

FIG. 2 illustrates a result of operating the OTDR simulator as illustrated in FIG. 1. Events are positioned at two points that are 5 km and 5.005 km, respectively, away. In this case, a distance between the two points is 5 m. It can be checked that a termination point is at a point that is 5.3 km away and that a signal level decreases in the vicinity of this point. An 8-bit Golay code is generated, and other environment settings are as shown in a table proposed in FIG. 2.

Figure 3:
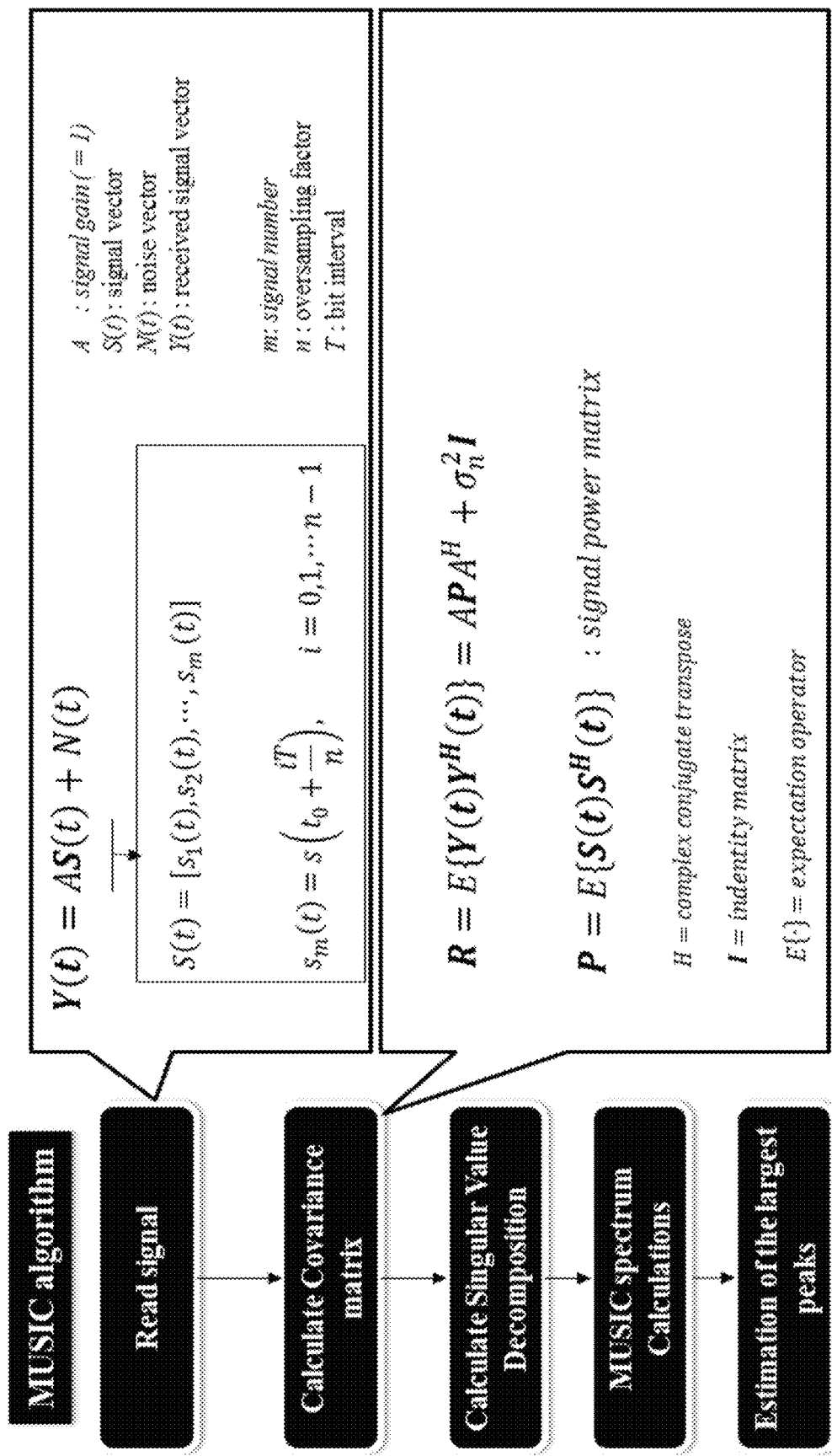
FIG. 3 is a diagram illustrating Step 1 of a MUSIC algorithm process for predicting a faulty section of an optical path.
Figure 4:
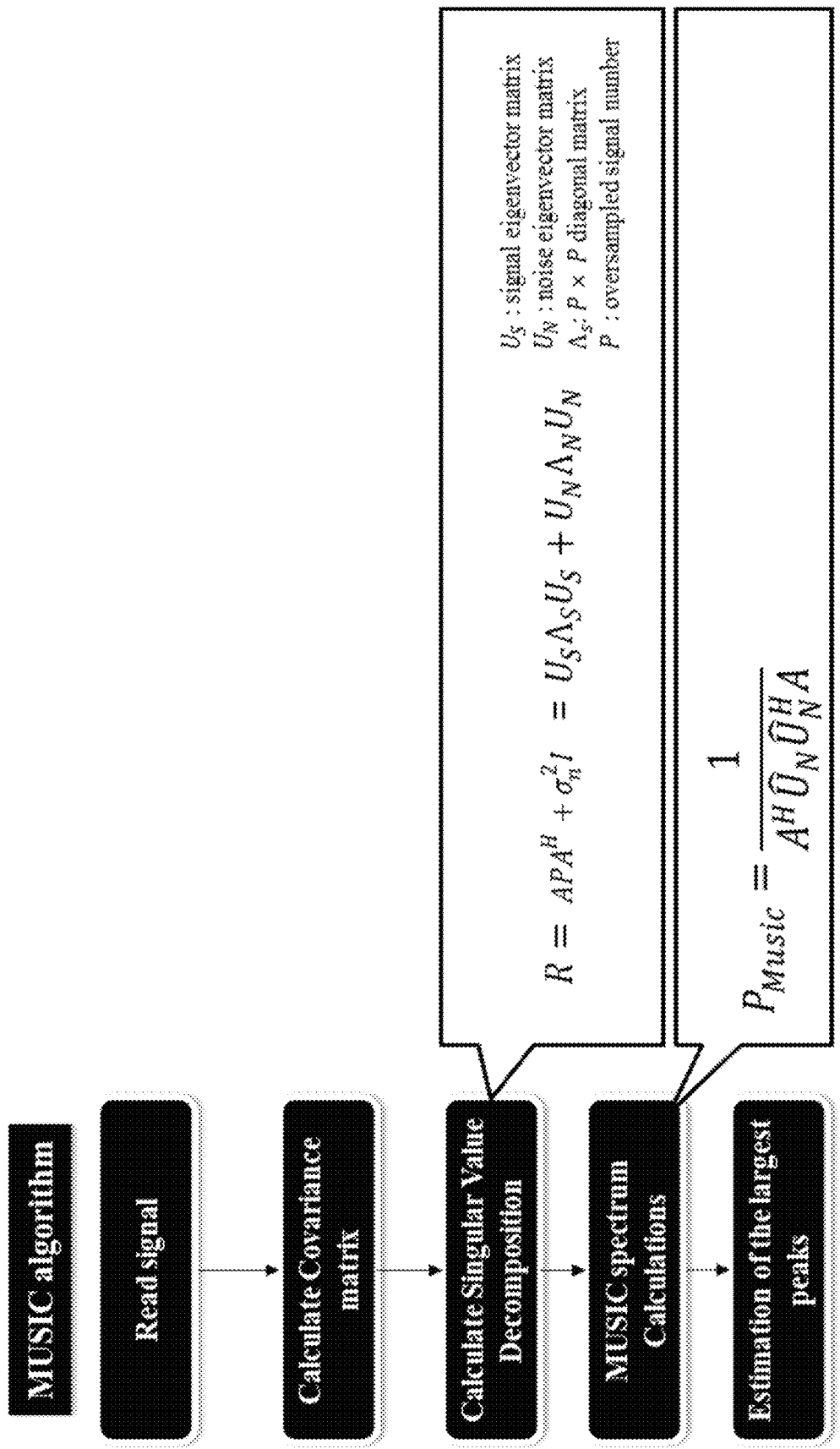
FIG. 4 is a diagram illustrating Step 2 of the MUSIC algorithm processing for predicting a faulty section of an optical path.
Figure 5A:
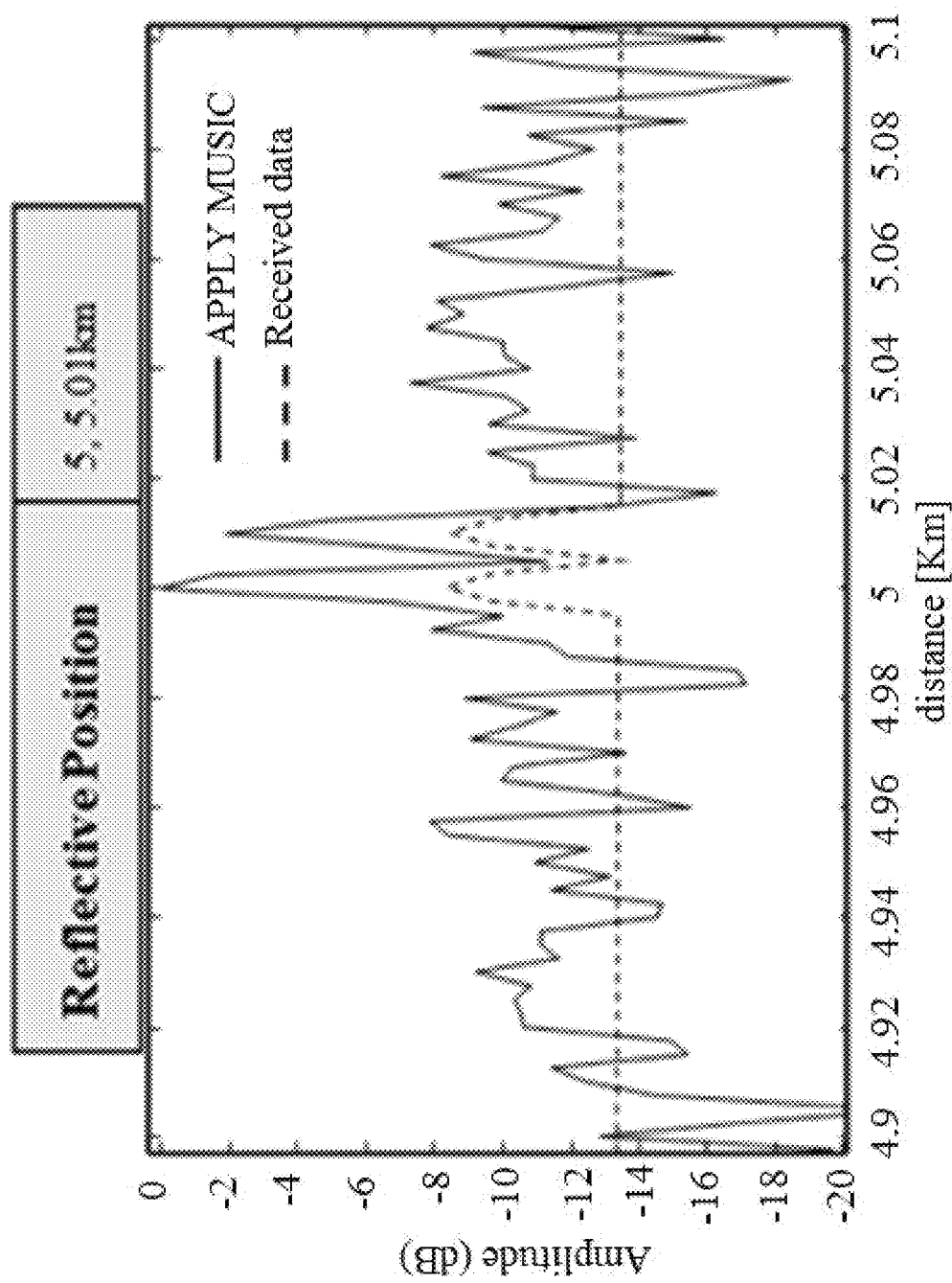
FIGS. 5A-5D are diagrams for describing performance of a MUSIC algorithm that depends on a distance between two event points.
Figure 5B:
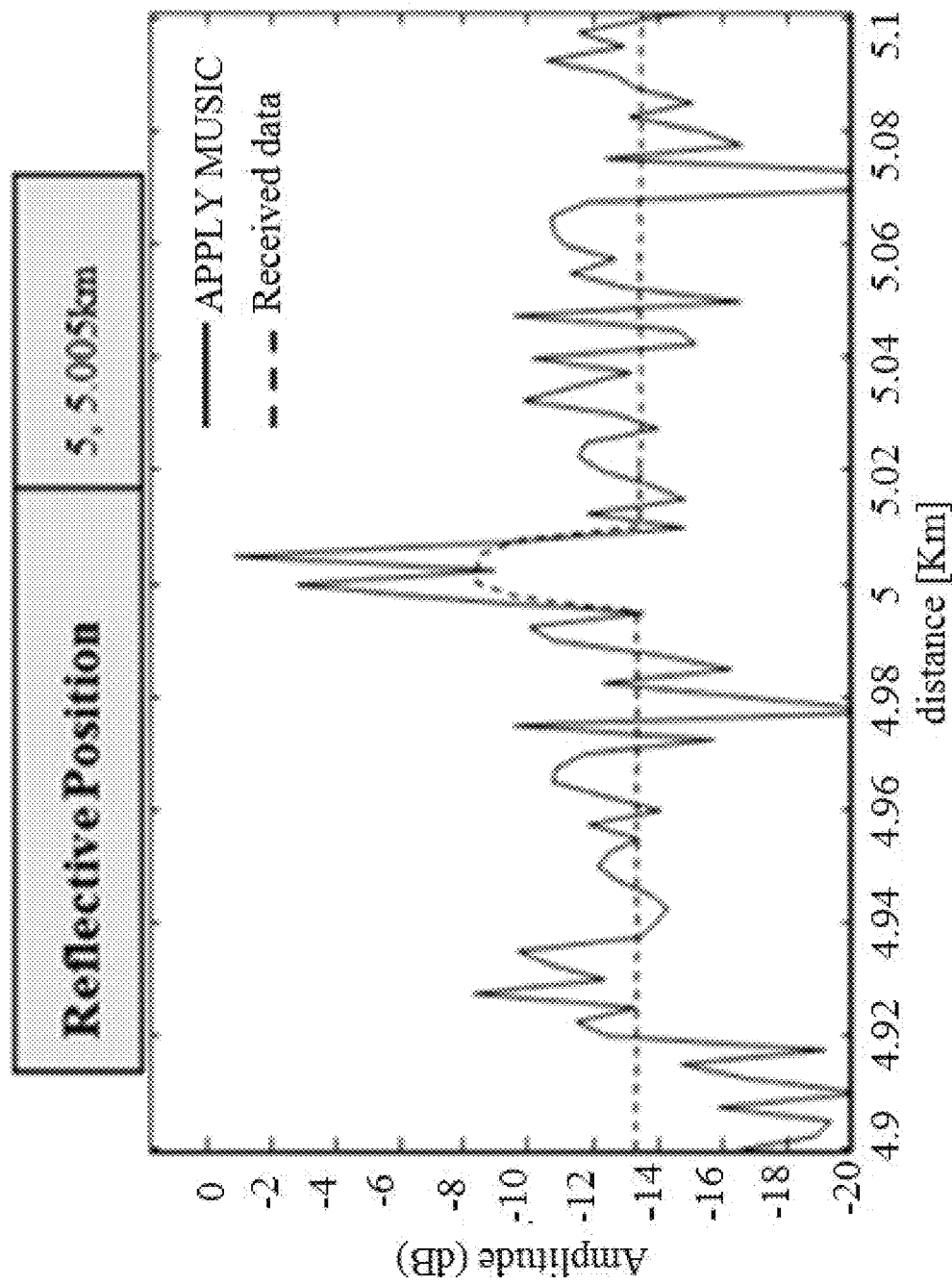
Figure 5C:
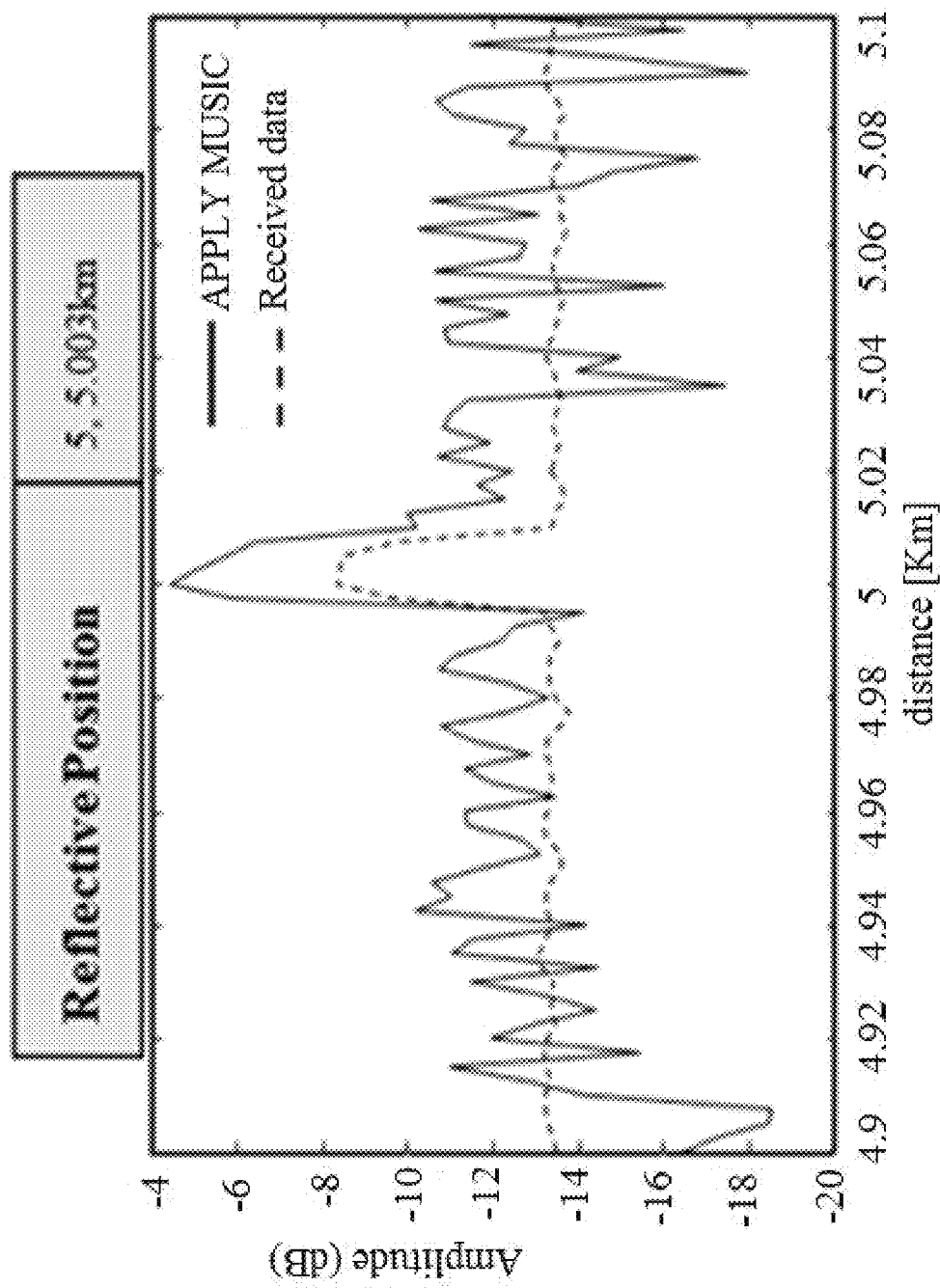
Figure 5D:
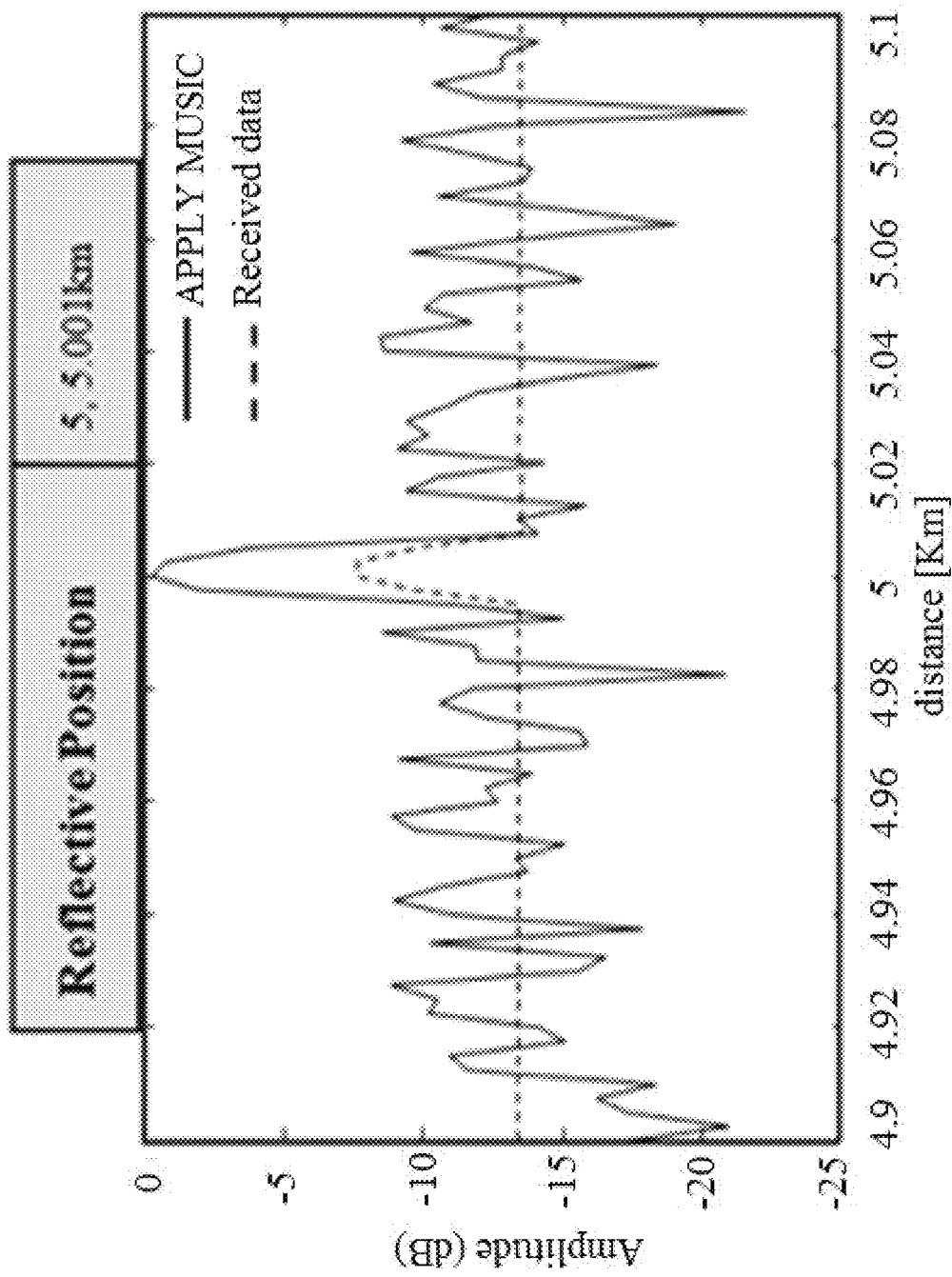

Method of Extracting a Faulty Session of an Optical Path Using Multiple Signal Classification (MUSIC) Algorithm A spatial resolution, along with a dynamic range, is the most typical parameter indicating performance of the OTDR. When a width of a pulse is smaller than two times a distance between two reflection objects, signals are reflected from the two points without overlapping each other. Thus, it is possible that the signals which are reflected are distinguished from each other. However, when the width of the pulse is greater than two times the distance between the two reflection objects, two reflection pulses overlap each other. Thus, the signals that are reflected are not distinguished from each other. Therefore, an algorithm for a super resolution is necessary to distinguish between the two reflection pulses. Among algorithms for a super resolution, the Multiple Signal Classification (MUSIC) algorithm is a signal processing scheme that is in the widest use. The MUSIC is known as a technology that involves arithmetic operations of high complexity but can provide precise estimation. A MUSIC algorithm processing method for predicting the faulty section of the optical path is described with reference to FIGS. 3 and 4.

The processing method broadly includes i) a step of receiving a signal along an optical path that is a target for measurement (Read Signal), ii) a step of generating a covariance matrix for the signal (Calculate Covariance Matrix), iii) a step of dividing the covariance matrix into a signal sub-space and a noise sub-space and performing eigenvalue decomposition (Calculate Singular Value Decomposition), iv) a step of calculating a MUSIC spectrum using the decomposed eigenvalue (MUSIC Spectrum Calculation), and v) a step of detecting a maximum value in the Music Spectrum (Estimation of the largest peak).

The details are as follows.

A signal Y(t) received by the OTDR is made up of signal vector S(t) and noise vector N(t). At this point, S(t) is expressed as $S(t)=[s_1(t), s_2(t), \ldots, s_m(t)]$ where m denotes the number of signals and $$s_m(t) = s\left(t_0 + \frac{\sigma}{n}\right), i = 0, 1, \ldots n-1$$

where T is bit interval and n is oversampling factor. A MUSIC technique is based on the eigenvalue decomposition of the covariance matrix for a received-signal Y(t) vector that is proposed. Covariance matrix R for the received signal is expressed as in the following equation.

$$R_w = E\{Y(t)Y^H(t)\} = APA^H + \sigma_n^2 I = R_s + R_W$$

where H denotes Hermitian transpose. From Equation 1, it can be seen that covariance matrix R is expressed as the sum of signal covariance matrix Rs and noise covariance matrix Rw. $P=E\{S(t)S^H(t)\}$ is a signal covariance matrix, and $R_W=E\{N(t)N^H(t)\}$ is a noise covariance matrix. There is no correlation between additional noises. When it is assumed that a noise average is 0 and distribution $\sigma_n^2$ is the same, the noise covariance matrix is expressed as $R_W=\sigma_n^2 I$. Rs is a Q by Q matrix of which a rank is apparently K. Therefore, each (Q-K) eigenvector corresponds to a noise vector Q by K that has an eigenvalue of 0. As a result, a K signal vector has orthogonality with a (Q-K) noise vector. In a case where there is no correlation among K signals, rank(APAH)=K. Using this equation, covariance matrix R is divided into a signal sub-space and a noise sub-space and is expressed as in the following equation.

$$R_w = APA^H + \sigma_n^2 I = U_S A_S U_S + U_N A_N U_N$$

where $U_S=[u_1, u_2, \ldots, u_K]$ is a signal eigenvector matrix and $U_N=[u_{K+1}, u_{K+2}, \ldots, u_M]$ is a noise eigenvector matrix. The noise sub-spaces that a column vector of $U_S$ spans are orthogonal to each other, and thus are defined as in the following equation.

$$P_{Music} = \frac{1}{A^H \hat{U}_N \hat{U}_N^H A}$$

Therefore, a reflection point can be estimated by detecting a point where a result of Equation 3 is a maximum.

FIGS. 5A-5D illustrate performance of the MUSIC algorithm that depends on the distance between the two event points. A simulation environment is as shown in a table in FIG. 2. In a case where the distance between the events is 5 m, with a result of the received data, it is impossible to identify at which point reflection occurs. In a case where the MUSIC algorithm is applied, a resolution is improved. Thus, a reflection point is possibly identified, and a reflection level at the event point also increases. This makes more precise analysis possible. When a distance to the event point decreases to 3 m, due to a sampling limitation, the distinction is impossible with the received data and the identification is also unclear with the MUSIC algorithm. In summary, it can be seen that the application of the MUSIC algorithm improves the resolution and that the precision of analysis decreases at or below the distance in the sampling.

However, a considerable amount of calculation is necessary to process the entire amount of data by applying the MUSIC algorithm. Particularly, the greater the amount of measurement data, the greater the amount of calculation. This actually imposes a considerable restriction on realization. Therefore, by partly applying the MUSIC algorithm, it is necessary to reduce the amount of calculation for predicting the faulty section. A process is performed in a manner similar to the method of partly applying the MUSIC algorithm. The process includes i) a step of dividing pieces of data on an optical-path reflection signal into predetermined unit groups (at this time, the number of pieces of data belonging to the unit group may be set arbitrarily).

ii) a step of determining whether or not a signal corresponding to a reflection event on a per-unit-group basis is present (in this case, when a difference between maximum and minimum values of pieces of data belonging to the unit group exceeds a predetermined threshold, it is determined that the reflection event occurs in the unit group), and iii) a step of applying a MUSIC algorithm to the unit group in which the signal corresponding to the reflection signal is detected (a scheme for applying the MUSIC algorithm may be as described above, that is, the MUSIC algorithm is applied by performing the following process steps:

a) a step of generating a covariance matrix for the signal (Calculate Covariance matrix), b) a step of dividing the covariance matrix into a signal sub-space and a noise sub-space and performing eigenvalue decomposition (Calculate Singular Value Decomposition), c) a step of calculating a MUSIC spectrum using the discomposed eigenvalue (MUSIC Spectrum Calculation), and d) a step of detecting a maximum value in the MUSIC spectrum (Estimation of the largest peak).

Figure 6:
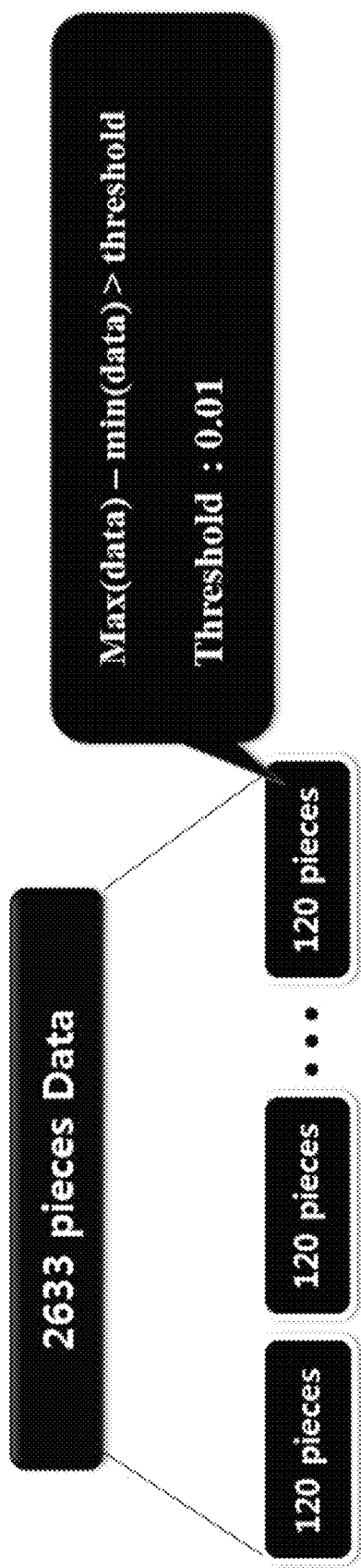
FIG. 6 is a diagram an example in which 2633 pieces of optical-path reflection signal data are divided into 120 groups.

The process will be described in detail below. FIG. 6 illustrates an example in which 2633 pieces of optical-path reflection signal data are divided into 120 unit groups. A threshold, for example, is 0.01. First, when an experiment was made with the MATLAB-based OTDR simulator in a simulation situation proposed in FIG. 2, the total number of pieces of measurement data was 2633. The 2633 pieces of measurement data are grouped into a total of 22 unit groups each consisting of approximately 120 pieces of measurement data. These values are arbitrary and are subject to change. A difference between maximum and minimum values in each unit group is obtained. Then, the difference is compared with a predetermined threshold. When the difference exceeds the threshold, it is assumed that the signal corresponding to the reflection event is present in the unit group, and the MUSIC algorithm is applied. When the difference does not exceed the threshold, it is assumed that the signal is not present, and thus the MUSIC algorithm is not applied. The threshold here was 0.01. The threshold is an arbitrary value that may change according to a measurement environment.

Figure 7:
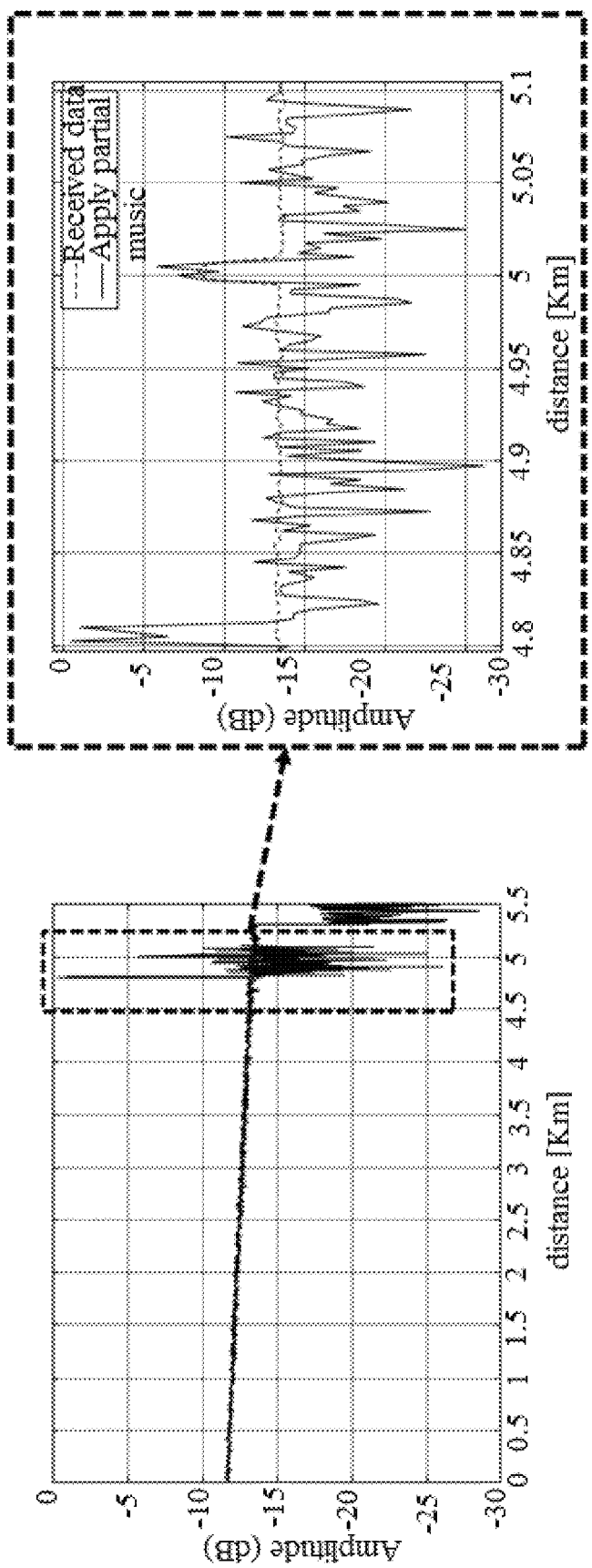
FIG. 7 is a diagram illustrating a result that was obtained when partly applying the MUSIC algorithm.
Figure 8:
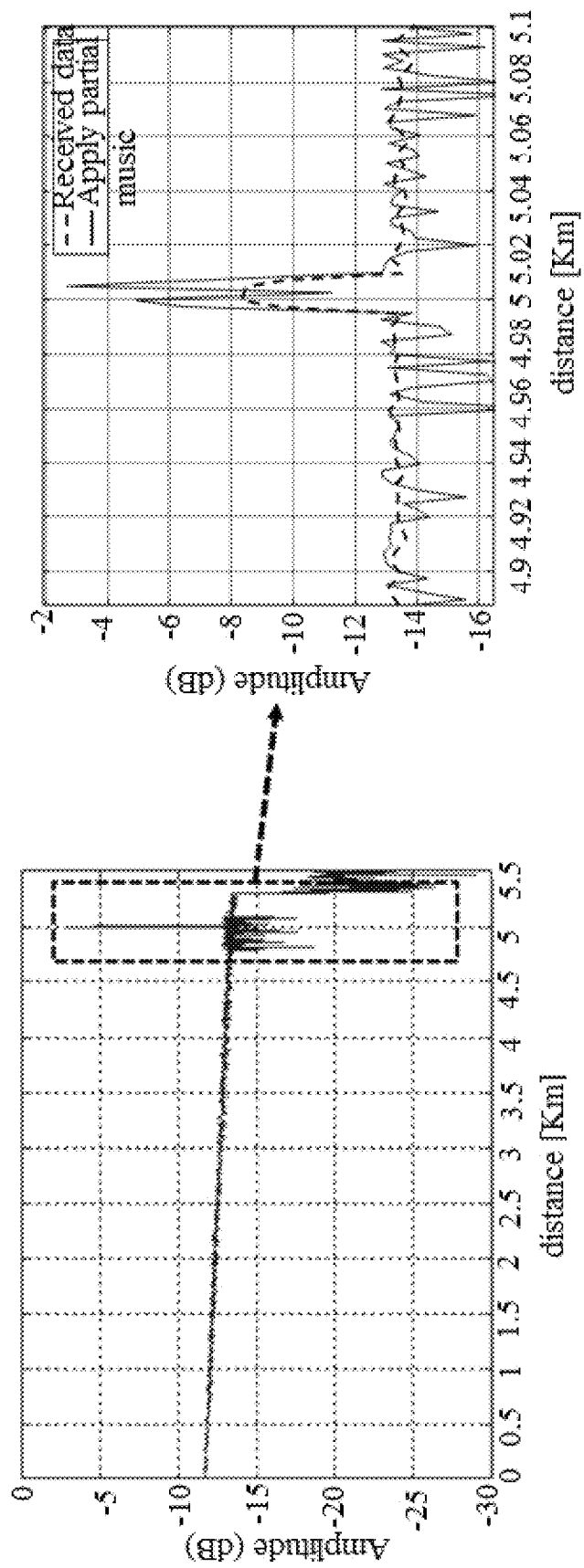
FIG. 8 is a diagram illustrating a result that was obtained by partly applying the MUSIC algorithm in a case where a padding was inserted.

FIG. 7 is a diagram illustrating a result that was obtained when partly applying the MUSIC algorithm. It was checked that a signal occurred in an event section between the points that were 5 km and 5.005 km, respectively, away, but a singularity that occurs by partly applying the MUSIC algorithm to a front portion of the event section may be present. In order to solve this problem, it is desirable that one padding is inserted in front of and in rear of the data group and that the MUSIC algorithm is then applied. No limitation is imposed on the number of paddings that are inserted, and for example, 20 paddings may be inserted in front of and in rear of the data group. FIG. 8 illustrates a result that was obtained by partly applying the MUSIC algorithm in a case where the padding was inserted. It was checked that, as described above, the result was improved more than before. It was also checked that due to the insertion of the padding, data fluctuation decreased.

Analysis of Performance that Results when an Improved MUSIC Algorithm is Applied Simple inspection and performance analysis of an improved MUSIC algorithm were performed. The inspection and the performance analysis were proposed to reconfigure a conjugate matrix of a data matrix for the MUSIC algorithm, and the performance analysis was performed to obtain higher resolution than when using the existing algorithm. The MUSIC algorithm is used for spatial spectrum estimation of an incoherent signal. When a signal source is coherent, coherent signals are combined into one signal. A received independent signal source decreases in magnitude due to the coherent signal. This decreases the covariance matrix rank and leads to the result that the number of higher eigenvalues is smaller than the number of incoming signals. Coherent light here is light that has a single frequency spectrum and a phase-consistent light wave, that is, a uniform sinusoidal wave. The coherent light is light, such as that emitted from a laser or a fluorescent tube, that does not generate heat. Completely coherent light is light that has a single wavelength, that is, is monochromatic light. Incoherent light is light that has various frequencies and amplitudes, and a phase-inconsistent light wave. The incoherent light is light, such as that emitted from the sun or an electric light bulb, that generates heat. The incoherent light is light that frequently occurs in the natural world. Therefore, a correlation between signals has to be removed in order to precisely estimate the coherent signal.

First, transformation matrix T is created in order to apply the algorithm. At this point, T is an M-th order inverse unit matrix that is referred to as a transition matrix.

$$T = \begin{bmatrix} 0 & 0 & \ldots & 1 \\ 0 & 0 & \ldots & 0 \\ \ldots & \ldots & \ldots & 0 \\ 1 & 0 & \ldots & 0 \end{bmatrix}$$

When Y=TY*(t), Y*(t) is a complex conjugate of Y(t). A covariance matrix Y is as follows.

$$R_y = E\{YY^H\} = TRY^*(t)T$$

where R denotes a sum of Rx and Ry. A conjugate matrix that is reconfigured as follows can be obtained using the equation described above.

$$R = R_x + R_y = APA^H + T[APA^H]^*T + 2\sigma_n^2 I$$

According to a matrix theory, when u is an eigenvector corresponding to a eigenvalue that is zero, of matrix APA, u is an eigenvector corresponding to an eigenvalue that is zero, of matrix T[APA$^H$]*T. Therefore, matrixes Rx, Ry, and R has the same noise sub-space. When the eigenvalue decomposition of R is performed, an eigenvalue and an eigenvector are obtained. The noise sub-space between the eigenvectors can be identified according to the number of signals to be estimated. The MUSIC spatial spectrum is configured as a new noise sub-space is as follows.

$$P_{Imusic} = \frac{1}{A^H \hat{U}_N \hat{U}_N^H A}$$

A major feature of the improved MUSIC algorithm is that information on magnetic correlation between Y(t) and Y is utilized and thus the capability to process adjacent correlated signals is improved. This improvement corresponds to the effect that smoothing is performed on a data covariance matrix in the forward direction and sequentially and thus that the number of snapshots increases two-fold.

Figure 9:
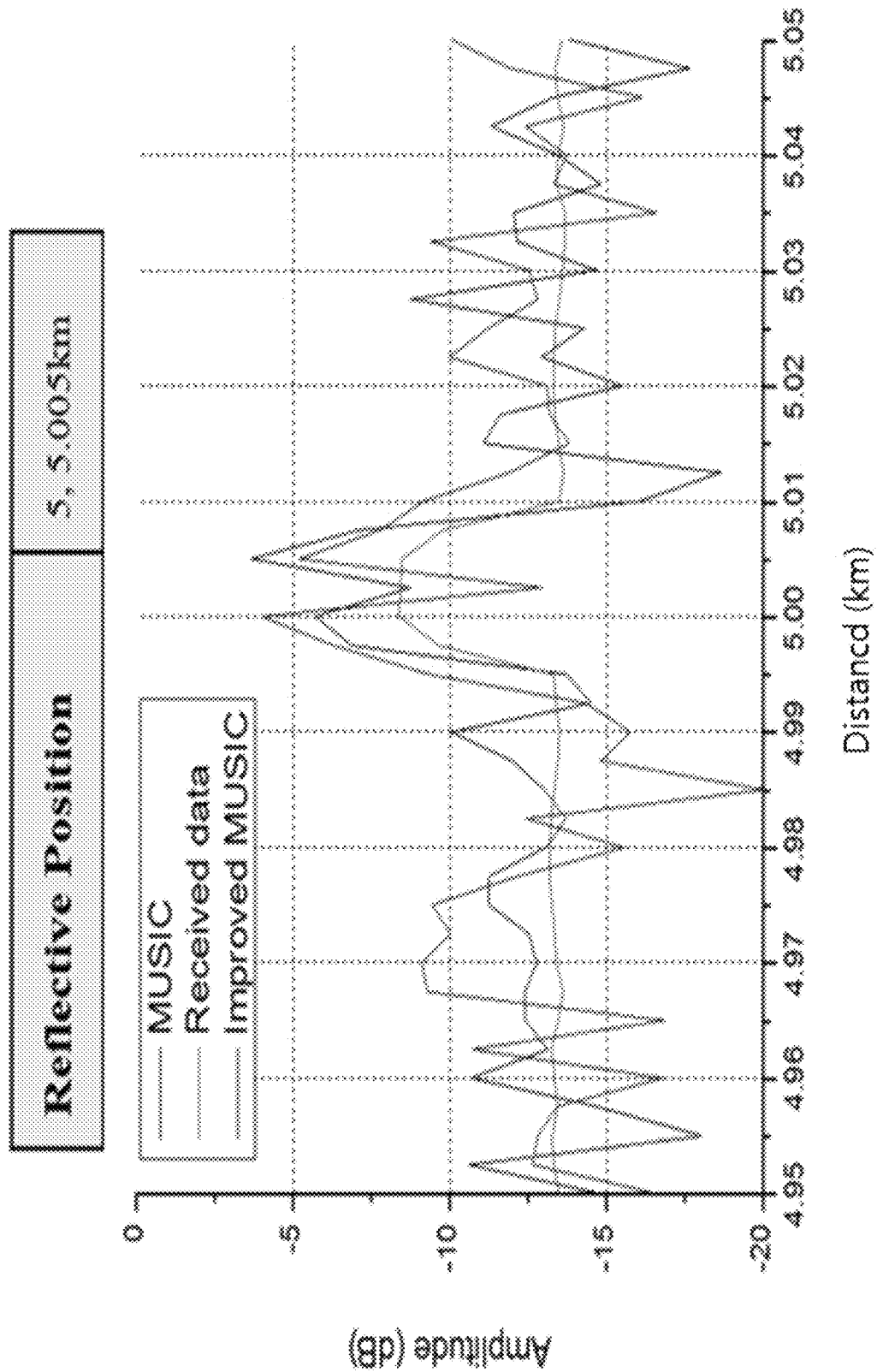
FIG. 9 is a diagram illustrating a result of comparison between an improved MUSIC algorithm and the MUSIC algorithm, which was obtained by conducting a simulation experiment.

The result of the comparison between the improved MUSIC algorithm and the MUSIC algorithm, which was obtained by conducting the simulation experiment, is as illustrated in FIG. 9. It can be checked that a length of the event section is 5 m and that the received data cannot decompose the length of 5 m. The MUSIC algorithm decomposed the length of 5 m and the reflection level at the event point also increased. Thus, more precise analysis is possible. It can be checked that the improved MUSIC algorithm has higher resolution than the existing MUSIC algorithm.

A process that is performed when applying the improved MUSIC algorithm, includes i) a step of dividing pieces of data on an optical-path reflection signal into predetermined unit groups (at this time, the number of pieces of data belonging to the unit group may be set arbitrarily).

ii) a step of determining whether or not a signal corresponding to a reflection event on a per-unit-group basis is present (in this case, when a difference between maximum and minimum values of pieces of data belonging to the unit group exceeds a predetermined threshold, it is determined that the reflection event occurs in the unit group), and iii) a step of applying an improved MUSIC algorithm to a unit group in which the signal corresponding to the reflection event is detected (a scheme for applying the improved MUSIC algorithm may be as described above).

When applying the improved MUSIC algorithm, as illustrated above, a padding may also be inserted in front of and in rear of the unit group in order to remove the data fluctuation.

The invention claimed is:

1. A method of extracting a faulty section of an optical path using a super resolution algorithm, the method comprising:
   dividing a received signal into predetermined unit groups;
   obtaining, for each unit group, of the predetermined unit groups, a difference between maximum and minimum values of pieces of data in respective unit groups;
   comparing the differences with a predetermined threshold, wherein a signal corresponding to a reflection event occurs in the respective unit groups when respective differences exceed the predetermined threshold; and
   generating a Multiple Signal Classification (MUSIC) spectrum by applying a MUSIC algorithm or an improved MUSIC algorithm to only unit groups, of the predetermined unit groups, in which the signal corresponding to the reflection event occurs.

2. The method of claim 1, wherein, when the MUSIC algorithm or the improved MUSIC algorithm is applied to the unit group in which the signal corresponding to the reflection event occurs, among the predetermined unit groups, a predetermined number of paddings are inserted in front of and in rear of the unit group.

* * * * *